US012006240B2

(12) United States Patent
Consalo et al.

(10) Patent No.: US 12,006,240 B2
(45) Date of Patent: Jun. 11, 2024

(54) METHOD OF SUSPENDING ELEMENTAL SULFUR IN WATER

(71) Applicant: SOLENIS TECHNOLOGIES, L.P., Wilmington, DE (US)

(72) Inventors: Corinne E. Consalo, Wilmington, DE (US); John S. Chapman, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 787 days.

(21) Appl. No.: 16/583,686

(22) Filed: Sep. 26, 2019

(65) Prior Publication Data
US 2020/0095148 A1   Mar. 26, 2020

Related U.S. Application Data

(60) Provisional application No. 62/736,636, filed on Sep. 26, 2018.

(51) Int. Cl.
*C02F 5/10* (2023.01)
*C09K 8/532* (2006.01)
*C23F 11/16* (2006.01)
*C02F 101/10* (2006.01)
*C02F 103/02* (2006.01)
*C02F 103/10* (2006.01)
*C23F 14/02* (2006.01)

(52) U.S. Cl.
CPC ............... *C02F 5/10* (2013.01); *C09K 8/532* (2013.01); *C23F 11/163* (2013.01); *C02F 2101/101* (2013.01); *C02F 2103/023* (2013.01); *C02F 2103/10* (2013.01); *C23F 14/02* (2013.01)

(58) Field of Classification Search
CPC .................. C02F 5/10; C02F 2101/101; C02F 2103/023; C02F 2103/10; C02F 5/12; B01D 2251/106; B01D 2257/304; B01D 53/52
See application file for complete search history.

(56) References Cited

U.S. PATENT DOCUMENTS

| | | | |
|---|---|---|---|
| 2,028,482 A | 1/1936 | Tucker | |
| 5,171,459 A | 12/1992 | Kaplan | |
| 5,223,160 A | 6/1993 | Emmons | |
| 9,355,444 B2 | 5/2016 | Nava et al. | |
| 11,261,371 B2 | 3/2022 | Solastiouk et al. | |
| 2010/0056404 A1* | 3/2010 | Talley | C10L 3/102 507/239 |
| 2010/0275382 A1* | 11/2010 | Calvert | C11D 1/835 510/332 |
| 2012/0080641 A1 | 4/2012 | Relenyi | |
| 2012/0220500 A1 | 8/2012 | Matza et al. | |
| 2014/0224743 A1* | 8/2014 | Janak | C02F 1/683 210/700 |
| 2016/0068742 A1* | 3/2016 | Solastiouk | C09K 8/602 166/270.1 |
| 2019/0062184 A1* | 2/2019 | Mantri | C07H 15/04 |

FOREIGN PATENT DOCUMENTS

| | | | | |
|---|---|---|---|---|
| CN | 107265752 A | 10/2017 | | |
| GB | 1392813 A | * | 4/1975 | C01B 17/10 |
| GB | 1392813 A | | 4/1975 | |
| JP | 2020531654 A | | 11/2020 | |
| RU | 1089896 A1 | | 6/2000 | |
| RU | 2655344 C2 | | 5/2018 | |
| SU | 983036 A1 | | 12/1982 | |
| WO | 2019040419 A1 | | 2/2019 | |

OTHER PUBLICATIONS

Dell; Optical Density for Absorbance Measurements, Oct. 22, 2012, p. 1-2 (Year: 2012).*
DOW, A Broad Range of Anionic and Nonionic Products, Mar. 23, 2006, p. 5 (Year: 2006).*
ChemIDplus, Tergitol TMN-6, Aug. 28, 2016, p. 1-3 (Year: 2016).*
Filipovic, Chemical Biology of H2S Signaling through Persulfidation, Feb. 14, 2018, p. 13, 56 (Year: 2018).*
Henning, KOLB Colloquium—Biofilm Connect Industries, Nov. 11, 2015, p. 1-9 (Year: 2015).*
Myers, Improving accuracy of cell and chromophore concentration measurements using optical density, Apr. 22, 2013, p. 1-15 (Year: 2013).*
Mandal A. et al., "Characterization of Surfactant Stabilized Nanoemulsion and Its Use in Enhanced Oil Recovery", SPE International Oilfield Nanotechnology Conference and Exhibition, Noordwijk, The Netherlands [online], Jun. 12-14, 2012, document SPE-155406-MS, [retrieved on Nov. 7, 2019], retrieved from the Internet: < DOI: 10.2118/155406-MS>, 13 pp.; see entire document, especially, p. 3.
Filipovic M. R. et al., "Chemical Biology of H2S Signaling through Persulfidation", Chemical Reviews [online], Nov. 7, 2017 [retrieved on Nov. 7, 2019], vol. 118, issue 3, retrieved from the Internet: < DOI: 10.1021/acs.chemrev.7b00205 >, pp. 1253-1337; see entire document, especially, p. 1255-1257, 1260, 1302.
ISA/US, International Search Report and Written Opinion issued in Int. Appl. No. PCT/US2019/053106 dated Dec. 18, 2019.
Mandal A. et al.; "Characterization of Surfactant Stabilized Nanoemulsion and Its Use in Enhanced Oil Recovery", SPE International Oilfield Nanotechnology Conference and Exhibition, Noordwijk, The Netherlands; Dec. 6, 2012).
Filipovic M. R. et al., "Chemical Biology of H2S Signaling through Persulfidation", Chemical Reviews, vol. 118, No. 3, pp. 1253-1337; Jul. 11, 2017).

(Continued)

*Primary Examiner* — Clare M Perrin
(74) *Attorney, Agent, or Firm* — Lorenz & Kopf, LLP

(57) ABSTRACT

A method of suspending elemental sulfur in water includes the steps of providing water including elemental sulfur and hydrogen sulfide and adding from about 1 to about 100 parts by weight of a sulfur suspension additive to the water based on one million parts by weight of the water to suspend the elemental sulfur in the water. The sulfur suspension additive is chosen from an alkyldiphenyloxide disulfonate or salt thereof, a secondary alcohol ethoxylate, a non-ionic ethylene oxide and/or propylene oxide copolymer, and combinations thereof.

14 Claims, No Drawings

(56) References Cited

OTHER PUBLICATIONS

Hidayat et al., Increased Generation Performances by Using Sulfur Dispersant in the Cooling Tower at the Wayang Windu Geothermal Power Plant (A Lesson Learned from Wayang Windu Geothermal Power Plant Operation); GRC Transactions, vol. 40, 2016, p. 829-838.

* cited by examiner

METHOD OF SUSPENDING ELEMENTAL SULFUR IN WATER

CROSS-REFERENCE TO RELATED APPLICATIONS

This application claims the benefit of U.S. Provisional Application No. 62/736,636, filed Sep. 26, 2018, which is hereby expressly incorporated herein in its entirety by reference.

TECHNICAL FIELD

The present disclosure generally relates to a method of suspending elemental sulfur in water. More specifically, this disclosure relates to adding a particular sulfur suspension additive to water that includes elemental sulfur and hydrogen sulfide so as to suspend the sulfur in the water.

BACKGROUND

The problem of solid mineral deposits in geothermal power plants and in the oil and gas industry is substantial and costly. The geothermal fluids used in power generation often have high levels of hydrogen sulfide and carbonate which can form solid deposits on heat exchanger surfaces, cooling tower fill, and within pipes. These deposits reduce heat transfer efficiency, clog nozzles and require periodic system shutdowns, resulting in the loss of power production, increased costs, and reduced profitability. When examined, the deposits from the geothermal cooling system contain elemental sulfur, polysulfides, and metal sulfides.

The issue of sulfur deposition has been addressed by removing hydrogen sulfide from the water by using sulfide scavengers, dissolving the deposits in situ via chemical treatment, or mechanical removal. Sulfide scavengers may be effective at removing hydrogen sulfide but the reaction products may be insoluble themselves, cause carbonate scaling, or undesirable pH shifts. Mechanical cleaning requires a system shutdown and labor-intensive removal of deposits.

Keeping the sulfur suspended and/or re-suspending deposited sulfur solids allows for the in situ treatment of the issue without a costly shut-down. One of the early attempts to solve the problem is described in U.S. Pat. No. 2,028,482 which focuses on use of an aldehyde condensed with a sulfonic acid of the naphthalene series as an effective agent. Another patent, U.S. Pat. No. 5,223,160 focuses on use of a mixture of 10% lower alcohol, 10-20% of a non-ionic surfactant, and 15-35% of a chlorohydroxy phenyl ether of an alcohol. However, the use of solvents in many systems has become problematic. Additional attempts involve use of dialkyl sulfides, particularly dimethyl sulfide, as sulfur dispersing agents. Yet, their high cost and a requirement to recycle the solvent prevents widespread application. A currently marketed sulfur dispersing agent is DTEA II (Amsa, Inc.) which is 2-decylthio-ethanamine hydrochloride and is described in U.S. Pat. No. 9,355,444.

Minimization and prevention of deposition of elemental sulfur and sulfides in geothermal power operations and oil and gas extraction systems still requires an effective, inexpensive, and environmentally responsible solution for in situ treatment. In addition, the treatment should be substantially low in foaming, non-corrosive, and not interfere with other components of the water treatment operation. Therefore, there remains an opportunity for improvement. Furthermore, other desirable features and characteristics of the present disclosure will become apparent from the subsequent detailed description of the disclosure and the appended claims, taken in conjunction with this background of the disclosure.

BRIEF SUMMARY

This disclosure provides a method of suspending elemental sulfur in water. The method includes the steps of providing water including elemental sulfur and hydrogen sulfide and adding from about 1 to about 100 parts by weight of a sulfur suspension additive to the water based on one million parts by weight of the water to suspend the elemental sulfur in the water. The sulfur suspension additive is chosen from an alkyldiphenyloxide disulfonate or salt thereof, a secondary alcohol ethoxylate, a non-ionic ethylene oxide and/or propylene oxide copolymer, and combinations thereof.

This disclosure also provides a method of suspending elemental sulfur in water that includes providing the water and adding from about 10 to about 50 parts by weight of the sulfur suspension additive to the water based on one million parts by weight of the water to suspend the elemental sulfur in the water. In this embodiment, the alkyldiphenyloxide disulfonate or salt thereof has the following structure:

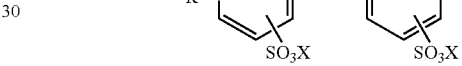

wherein R is an alkyl group having from 10 to 35 carbon atoms and each X is a sodium atom. The secondary alcohol ethoxylate includes a carbon backbone having 6 to 20 carbon atoms ethoxylated with at least one mole of ethylene oxide. The non-ionic ethylene oxide and/or propylene oxide copolymer includes the reaction product of an N-alkyl diethanolamine core and one or more moles of ethylene oxide and/or propylene oxide. Moreover, in this embodiment, the step of adding creates a mixture that has an optical density of at least 0.05 measured at 230 nm using a UV-Vis spectrophotometer when the water including the elemental sulfur and the hydrogen sulfide and free of the sulfur suspension additive has an optical density of about 0.006 measured at 230 nm using a UV-Vis spectrophotometer.

This disclosure further provides a sulfur suspending composition including water, elemental sulfur, hydrogen sulfide, and a sulfur suspension additive chosen from an alkyldiphenyloxide disulfonate or salt thereof, a secondary alcohol ethoxylate, a non-ionic ethylene oxide and/or propylene oxide copolymer, and combinations thereof.

DETAILED DESCRIPTION

The following detailed description is merely exemplary in nature and is not intended to limit the disclosure. Furthermore, there is no intention to be bound by any theory presented in the preceding background or the following detailed description. Embodiments of the present disclosure are generally directed to a method of suspending elemental sulfur in water and a composition for the same. For the sake of brevity, conventional techniques may not be described in detail herein. Moreover, the various tasks and process steps described herein may be incorporated into a more comprehensive procedure or process having additional steps or functionality not described in detail herein. In particular, various steps in the manufacture of components of the composition may be well-known and so, in the interest of brevity, many conventional steps will only be mentioned briefly herein or will be omitted entirely without providing the well-known process details.

This disclosure provides a method of suspending elemental sulfur in water. Typically, the water includes at least elemental sulfur and hydrogen sulfide. However, it is contemplated that the water may be free of the hydrogen sulfide or include amounts smaller than typical detection limits. The amounts of sulfur and hydrogen sulfide in the water are not particularly limited and may be any amount, e.g. any amount found in water used in geothermal, natural gas, oil, fracking, and power generation industries. In various embodiments, the amount of hydrogen sulfide is about 2, 1, 0.5, or 0.1, or less, parts by weight per one million parts by weight of the water. It is desirable to suspend the elemental sulfur in the water so as to reduce the chance that the elemental sulfur can stick to machinery used in the aforementioned industries. For example, elemental sulfur can contribute to solid deposits on heat exchanger surfaces, cooling tower fill, and within pipes which reduces heat transfer efficiency, clogs nozzles, and requires periodic system shutdowns, resulting in the loss of efficiency, increased costs, and reduced profitability.

The terminology "suspending" typically describes that the elemental sulfur is wetted and solid particles of the elemental sulfur are dispersed in the water. Typically, if the elemental sulfur floats on the top of the water or sinks to the bottom of a container, such as a test tube, the sulfur is not considered to be suspended. The determination of whether the elemental sulfur is suspended in the water may be made based on turbidity or optical density of the water, as is described in greater detail below. For example, if the elemental sulfur either floats on the top of the water or sinks to the bottom, the turbidity or optical density of the water may not be affected, thus signaling that the elemental sulfur is not suspended. If the elemental sulfur floats on the top of the water, this generally indicates that the elemental sulfur is not wetted by a sulfur suspension additive, as is described below. If the elemental sulfur is not wetted, then it is more likely to be available to stick to machinery and contribute to unwanted deposits thereon. If the elemental sulfur drops to the bottom of the water, the elemental sulfur may also still contribute to the unwanted deposits.

The method includes the step of providing water including the elemental sulfur and the hydrogen sulfide. The water may also include, or be free of, many other compounds including, but not limited to, polysulfides, metal sulfides, and any compounds known by those of skill in the art to typically be found in water used in geothermal, natural gas, oil, fracking, and power generation industries. In other embodiments, the water and/or the combination of the water and the sulfur suspension additive, may be free of, or include less than about 1, 0.5, 0.1, 0.05, or 0.01, wt %, of any one or more optional additives or compounds described herein.

The method also includes the step of adding from about 1 to about 100 parts by weight of the sulfur suspension additive to the water based on one million parts by weight of the water to suspend the elemental sulfur in the water. In various embodiments, about 5 to about 95, about 10 to about 90, about 15 to about 85, about 20 to about 80, about 25 to about 75, about 30 to about 70, about 35 to about 65, about 40 to about 60, about 45 to about 55, about 45 to about 50, about 50 to about 75, about 75 to about 100, about 25 to about 50, about 25 to about 75, about 25 to about 100, about 50 to about 100, etc., parts by weight of the sulfur suspension additive is added to the water based on one million parts by weight of the water to suspend the elemental sulfur in the water. In various non-limiting embodiments, all values and ranges of values including and between those set forth above are hereby expressly contemplated for use.

Typically, the sulfur suspension additive is chosen from an alkyldiphenyloxide disulfonate or salt thereof, a secondary alcohol ethoxylate, a non-ionic ethylene oxide and/or propylene oxide copolymer, and combinations thereof. These compounds, as a genus, are not particularly limited and specific compounds used herein may be any species that falls within its related genus, as would be understood by one of skill in the art.

For example, the alkyldiphenyloxide disulfonate or salt thereof may be any known in the art and typically has the following structure

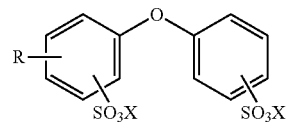

wherein R is an alkyl group having from 1 to 35 carbon atoms and each X is independently a cation. The alkyl group may be linear, branch, or cyclic. Moreover, the cation may be any that balance a (−1) negative charge on the sulfate anion. Typically, the cation is a (+1) cation such as $Na^{+1}$, $K^{+1}$, etc. However, any other inorganic cation may be used. Alternatively, any organic (+1) cation may also be used. In various embodiments, R is an alkyl group having from 5 to 35, 10 to 30, 15 to 25, 15 to 20, 1, 2, 3, 4, 5, 6, 7, 8, 9, 10, 11, 12, 13, 14, 15, 16, 17, or 18, carbon atoms. In other embodiments, R is an alkyl group having from 6 to 18, 8 to 16, 10 to 14, 10 to 12, 12 to 14, 12 to 16, 12 to 18, 10 to 16, 10 to 18, 8 to 18, 8 to 16, 8 to 14, 8 to 12, 8 to 10, 30 to 34, 30 to 32, 32 to 34, 28 to 24, 28 to 32, or 28 to 30, carbon atoms. In another embodiment, R is an alkyl group having 6, 10, or 12 carbon atoms. In one embodiment, R is an alkyl group having 10 to 14 carbon atoms and X is $Na^+$. In another embodiment, R is an alkyl group having 12 carbon atoms and X is $Na^+$. In a further embodiment, R is an alkyl group having 30 to 32 carbon atoms and X is $Na^+$. In various non-limiting embodiments, all values and ranges of values including and between those set forth above are hereby expressly contemplated for use.

In various embodiments, suitable alkyldiphenyloxide disulfonates or salts thereof are commercially available from Dow Chemical under the tradenames of DOWFAX™ 2A1, DOWFAX™ 3B2, DOWFAX™ 8390; DOWFAX™ C6L, DOWFAX™ C10L, DOWFAX™ 30599, and the like. In other embodiments, suitable alkyldiphenyloxide disulfonates or salts thereof are commercially available from Pilot Chemical under the tradenames of Calfax L-45, Calfax 16L-35, Calfax 6LA-70, Calfax DB-45, Calfax DBA-40, Calfax DBA-70, and the like.

Referring now to the secondary alcohol ethoxylate, this compound has an alcohol ethoxylate moiety bonded to a secondary carbon atom. Any secondary alcohol ethoxylate may be utilized. In one embodiment, the secondary alcohol ethoxylate can be more broadly described as a secondary alcohol alkoxylate. For example, a secondary alcohol propoxylate may be utilized and may include the same number of moles of propylene oxide as is described herein relative to ethylene oxide. Alternatively, a secondary ethoxylate/propoxylate may also be utilized and may include the same number of moles of ethylene oxide and/or propylene oxide as is described herein relative to ethylene oxide. For example, any one or more of the aforementioned ethoxylates, propoxylates, or ethoxylates/propoxylates may include at least one mole of ethylene oxide and/or propylene oxide. In other embodiments, this number of moles is 1, 2, 3, 4, 5, 6, 7, 8, 9, 10, or more. In other embodiments, this number of moles is from 1 to 100, 1 to 75, 1 to 50, 1 to 25, 1 to 20, 2 to 19, 3 to 18, 4 to 17, 5 to 16, 6 to 15, 7 to 14, 8 to 13, 9 to 12, or 10 to 11. In various embodiments, the secondary alcohol ethoxylate includes a carbon backbone having 6 to 20 carbon atoms ethoxylated with at least one mole of ethylene oxide. In other embodiments, the secondary alcohol ethoxylate includes a carbon backbone having 12 to 14 carbon atoms ethoxylated with about 7 to about 9 moles of ethylene oxide. In various non-limiting embodiments, all values and ranges of values including and between those set forth above are hereby expressly contemplated for use. In various embodiments, suitable secondary alcohol ethoxylates are commercially available from Dow Chemical under the tradenames of Tergitol 15-S-7, Tergitol 15-S-9, and the like.

Referring now to the non-ionic ethylene oxide and/or propylene oxide copolymer, this copolymer may include ethylene oxide moieties, propylene oxide moieties, or both ethylene oxide and propylene oxide moieties. In one embodiment, the non-ionic ethylene oxide and/or propylene oxide copolymer includes the reaction product of an N-alkyl diethanolamine core and one or more moles of ethylene oxide and/or propylene oxide. The core itself is not particularly limited and may be any core known in the art. For example, the core may be any amine. In various embodiments, the core is an alkyl amine. The alkyl amine may have any alkyl group known in the art. In various embodiments, the alkyl group has from 1 to 35, from 1 to 5, from 5 to 35, 10 to 30, 15 to 25, 15 to 20, 1, 2, 3, 4, 5, 6, 7, 8, 9, 10, 11, 12, 13, 14, 15, 16, 17, or 18, carbon atoms. In other embodiments, the alkyl group from 6 to 18, 8 to 16, 10 to 14, 10 to 12, 12 to 14, 12 to 16, 12 to 18, 10 to 16, 10 to 18, 8 to 18, 8 to 16, 8 to 14, 8 to 12, 8 to 10, 30 to 34, 30 to 32, 32 to 34, 28 to 24, 28 to 32, or 28 to 30, carbon atoms. In other embodiments, the non-ionic ethylene oxide and/or propylene oxide copolymer may include at least one mole of ethylene oxide and/or propylene oxide. In other embodiments, the non-ionic ethylene oxide and/or propylene oxide copolymer includes 1, 2, 3, 4, 5, 6, 7, 8, 9, 10, or more moles of ethylene oxide and/or propylene oxide per mole of the core. In other embodiments, this number of moles is from 1 to 100, 1 to 75, 1 to 50, 1 to 25, 1 to 20, 2 to 19, 3 to 18, 4 to 17, 5 to 16, 6 to 15, 7 to 14, 8 to 13, 9 to 12, or 10 to 11. In one embodiment, the non-ionic ethylene oxide/propylene oxide copolymer has the structure:

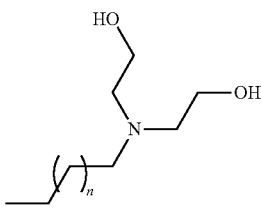

wherein n is from 1 to 15, e.g. 1 to 5, 5 to 10, 10 to 15, or any number therebetween. In various non-limiting embodiments, all values and ranges of values including and between those set forth above are hereby expressly contemplated for use. In various embodiments, suitable non-ionic ethylene oxide and/or propylene oxide copolymers are commercially available from Kolb under the tradenames of HEDICOL CLEAN100, HEDICOL DISP100, and the like.

The sulfur suspension additive is typically chosen such that it causes little to no foaming of the water. Those of skill in the art will appreciate what quantity of foam would be associated with the terms little to no foaming or substantially low foaming because allowable amounts of foam change depending on where the water is being utilized, e.g. in a cooling tower versus in a retention pond. Any method of evaluating the foaming may be utilized herein. Moreover, the sulfur suspension additive is typically chosen such that it is non-corrosive to the mechanical parts used in geothermal, natural gas, oil, fracking, and power generation industries. Those of skill in the art understand that specific corrosion standards may change based on what equipment is in contact with the water and the sulfur suspension additive. Any method of evaluating corrosiveness may be utilized herein. In addition, the sulfur suspension additive is chosen such that it does not interfere with other components used in geothermal, natural gas, oil, fracking, and power generation industries. These other components may include, but are not limited to, glycosides, alkyl sulphonates or alkyl amines/amides, glutaraldehyde, quaternary amines, MBT and chlorine compounds such as oxidizers, corrosion inhibitors, and the like, and combinations thereof. Typically, there are no, or minimized, side reactions between these other components and the sulfur suspension additive, as would be understood by one of skill in the art.

Referring back, the step of adding the suspension additive typically creates a mixture with the water wherein the mixture has an optical density of at least 0.05 measured at 230 nm using a UV-Vis spectrophotometer when the water that includes the elemental sulfur and the hydrogen sulfide and that is free of the sulfur suspension additive has an optical density of about 0.006 measured at 230 nm using a UV-Vis spectrophotometer. In other words, the optical density of the mixture is measured and compared with the optical density of a comparative/control sample that does not include the sulfur suspension additive but that still includes the elemental sulfur and the hydrogen sulfide. In various embodiments, the optical density is from about 0.05 to about 0.7, about 0.05 to about 0.1, about 0.1 to about 0.7, about 0.15 to about 0.65, about 0.2 to about 0.6, about 0.25 to about 0.55, about 0.3 to about 0.5, about 0.35 to about 0.45, or about 0.4 to about 0.45, measured at 230 nm using a UV-Vis spectrophotometer when the water that includes the elemental sulfur and the hydrogen sulfide and that is free of the sulfur suspension additive has an optical density of about 0.006 measured at 230 nm using a UV-Vis spectrophotometer. The optical density of the mixture can vary from that set forth above based on the optical density of the water that includes the elemental sulfur and the hydrogen sulfide and that is free of the sulfur suspension additive. In various non-limiting embodiments, all values and ranges of values including and between those set forth above are hereby expressly contemplated for use.

To measure the aforementioned optical density, absorbance readings are typically taken at 230 nm. As is known in the art, absorbance is a measurement of the quantity of light absorbed by the solution. If there is no turbidity, then absorbance is equal to optical density. Optical density is a measurement of the quantity of light passing through a sample to a detector relative to the total quantity of light available. Optical density includes absorbance of the sample plus light scatter from turbidity and background. One can compensate for background by using blanks. Moreover, the following equation is typically used:

$$A = \log_{10}(I_0/I)$$

(Beer-Lambert Law)

wherein, $I_0$=incident light before it enters the sample; $I$=intensity of light after it passes through the sample; and $A$=measured absorbance.

ADDITIONAL EMBODIMENTS

This disclosure also provides a method of suspending elemental sulfur in water wherein the method includes the steps of providing water including elemental sulfur and hydrogen sulfide and adding from about 10 to about 50 parts by weight of a sulfur suspension additive to the water based on one million parts by weight of the water to suspend the elemental sulfur in the water. In this method, the sulfur suspension additive is chosen from an alkyldiphenyloxide disulfonate or salt thereof, a secondary alcohol ethoxylate, a non-ionic ethylene oxide and/or propylene oxide copolymer, and combinations thereof, wherein the alkyldiphenyloxide disulfonate or salt thereof has the following structure:

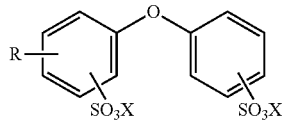

wherein R is an alkyl group having from 10 to 35 carbon atoms and each X is a sodium atom, wherein the secondary alcohol ethoxylate includes a carbon backbone having 6 to 20 carbon atoms ethoxylated with at least one mole of ethylene oxide, wherein the non-ionic ethylene oxide and/or propylene oxide copolymer includes the reaction product of an N-alkyl diethanolamine core and one or more moles of ethylene oxide and/or propylene oxide, and wherein the step of adding creates a mixture that has an optical density of at least 0.05 measured at 230 nm using a UV-Vis spectrophotometer when the water including the elemental sulfur and the hydrogen sulfide and free of the sulfur suspension additive has an optical density of about 0.006 measured at 230 nm using a UV-Vis spectrophotometer.

This disclosure also provides a sulfur suspending composition itself that includes the water, the elemental sulfur and the hydrogen sulfide and the sulfur suspension additive.

EXAMPLES

A series of compositions are created according to this disclosure and compared with a control composition. More specifically, 50 mg of elemental sulfur is added to various concentrations of surfactants and allowed to stir for 18 hours in glass beakers. Sulfur is insoluble in water and remains floating on the top in the control composition. After 18 hours, a sample is taken from each composition and optical density measurements are taken at 230 nm using a Spectra Max M3 Multi-mode Microplate and Cuvette Reader by Molecular Diagnostics along with SoftMax Pro 7.0 software. The optical density measurements are set forth below in Table 1 wherein increased optical density is indicative of the sulfur being wetted, pulled into solution, and dispersed, i.e., not settled to the bottom.

TABLE 1

| Composition | Components | Optical Density Measured at 230 nm |
|---|---|---|
| Control Composition | Tap water + 50 mg elemental sulfur | 0.006 |
| Composition 1 | 10 ppm Dowfax 2A1 in tap water + 50 mg elemental sulfur | 0.117 |
| Composition 2 | 25 ppm Dowfax 2A1 in tap water + 50 mg elemental sulfur | 0.36 |
| Composition 3 | 50 ppm Dowfax 2A1 in tap water + 50 mg elemental sulfur | 0.689 |
| Composition 4 | 10 ppm Hedicol CLEAN in tap water + 50 mg elemental sulfur | 0.029 |
| Composition 5 | 25 ppm Hedicol CLEAN in tap water + 50 mg elemental sulfur | 0.1 |
| Composition 6 | 50 ppm Hedicol CLEAN in tap water + 50 mg elemental sulfur | 0.249 |
| Composition 7 | 10 ppm Hedicol DISP in tap water + 50 mg elemental sulfur | 0.063 |
| Composition 8 | 25 ppm Hedicol DISP in tap water + 50 mg elemental sulfur | 0.146 |
| Composition 9 | 50 ppm Hedicol DISP in tap water + 50 mg elemental sulfur | 0.153 |
| Composition 10 | 10 ppm Dowfax 8390 in tap water + 50 mg elemental sulfur | 0.251 |
| Composition 11 | 25 ppm Dowfax 8390 in tap water + 50 mg elemental sulfur | 0.326 |
| Composition 12 | 50 ppm Dowfax 8390 in tap water + 50 mg elemental sulfur | 0.524 |
| Composition 13 | 10 ppm Dowfax 3B2 in tap water + 50 mg elemental sulfur | 0.275 |
| Composition 14 | 25 ppm Dowfax 3B2 in tap water + 50 mg elemental sulfur | 0.496 |
| Composition 15 | 50 ppm Dowfax 3B2 in tap water + 50 mg elemental sulfur | 0.831 |
| Composition 16 | 10 ppm Tergitol 15-S-7 in tap water + 50 mg elemental sulfur | 0.012 |
| Composition 17 | 25 ppm Tergitol 15-S-7 in tap water + 50 mg elemental sulfur | 0.119 |
| Composition 18 | 50 ppm Tergitol 15-S-7 in tap water + 50 mg elemental sulfur | 0.091 |
| Composition 19 | 10 ppm Tergitol 15-S-9 in tap water + 50 mg elemental sulfur | 0.046 |
| Composition 20 | 25 ppm Tergitol 15-S-9 in tap water + 50 mg elemental sulfur | 0.05 |
| Composition 21 | 50 ppm Tergitol 15-S-9 in tap water + 50 mg elemental sulfur | 0.538 |

Dowfax 2A1 is Alkyldiphenyloxide Disulfonate, 45% (Sodium benzeneoxybispropylenesulfonate)
Hedicol CLEAN is a mixture of etherified EO-PO polymer and N-alkyl diethanol amine type component, 10-25%.
Hedicol DISP is a mixture of etherified EO-PO polymer and N-alkyl diethanol amine type component, but contains water, 10-25%.
Dowfax 8390 is alkyldiphenyloxide Disulfonate, 35% (Disodium hexadecyldiphenyloxide disulfonate).
Dowfax 3B2 is alkyldiphenyloxide Disulfonate, 45% (Benzenesulfonic acid, decyl(sulfophenoxy)-, disodium salt.
Tergitol 15-S-7 is a C12-C14 Secondary alcohol ethoxylate, 100%, with approximately 7 moles of ethylene oxide.
Tergitol 15-S-9 is a C12-C14 Secondary alcohol ethoxylate, 100%, with approximately 9 moles of ethylene oxide.

The data set forth above indicates that when elemental sulfur comes into contact with one of the aforementioned chemistries, it is pulled into solution and suspended. The suspended sulfur particles therefore give the sample solutions turbidity, which is indicated by the optical density readings. The sulfur does not remain on the water's surface, deposit onto other surfaces (e.g. if stainless steel mesh coupons are suspended in the solutions or onto glass walls of the beakers) or fall out of solution. These results are unexpected and superior to what is currently known. Therefore, the data set forth above evidences that this disclosure provides an effective, inexpensive, and environmentally responsible solution for in situ treatment to minimize or prevent the deposition of sulfur and sulfides on various surfaces in many industries including, but not limited to, geothermal power operations and oil and gas extraction systems. In addition, this treatment is substantially low in foaming, non-corrosive, and does not interfere with other components of water treatment operations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of suspending elemental sulfur in water in a geothermal fluid, said method comprising the steps of:
   A. providing the geothermal fluid comprising water, elemental sulfur and hydrogen sulfide in a geothermal power plant; and
   B. adding from about 1 to about 100 parts by weight of a sulfur suspension additive to the geothermal fluid based on one million parts by weight of the water which suspends the elemental sulfur in the water,
   wherein the sulfur suspension additive is an alkyldiphenyloxide disulfonate or salt thereof.

2. The method of claim 1 wherein the alkyldiphenyloxide disulfonate or salt thereof has the following structure:

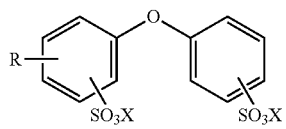

wherein R is an alkyl group having from 1 to 35 carbon atoms and each X is independently a cation.

3. The method of claim 2 wherein R is an alkyl group having 10 to 14 carbon atoms and X is Na$^{30}$.

4. The method of claim 3 wherein R is an alkyl group having 12 carbon atoms.

5. The method of claim 2 wherein R is an alkyl group having 30 to 32 carbon atoms and X is Na$^+$.

6. The method of claim 1 wherein the sulfur suspension additive is added in an amount of from about 10 to about 50 parts by weight based on one million parts by weight of the water.

7. The method of claim 1 wherein the step of adding creates a mixture that has an optical density of at least 0.05 measured at 230 nm using a UV-V is spectrophotometer when water comprising the elemental sulfur and the hydrogen sulfide and free of the sulfur suspension additive as a control sample has an optical density of about 0.006 measured at 230 nm using a UV-V is spectrophotometer.

8. A method of suspending elemental sulfur in a geothermal fluid, said method comprising the steps of:
   A. providing the geothermal fluid comprising water, elemental sulfur and hydrogen sulfide in a geothermal power plant; and
   B. adding from about 10 to about 50 parts by weight of a sulfur suspension additive to the geothermal fluid based on one million parts by weight of the water to suspend the elemental sulfur in the water,
   wherein the sulfur suspension additive is an alkyldiphenyloxide disulfonate or salt,
   wherein the alkyldiphenyloxide disulfonate or salt thereof has the following structure:

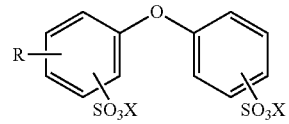

wherein R is an alkyl group having from 10 to 16 carbon atoms and each X is Na$^+$, and
wherein the step of adding creates a mixture that has an optical density of at least 0.05 measured at 230 nm using a UV-V is spectrophotometer when the water comprising the elemental sulfur and the hydrogen sulfide and free of the sulfur suspension additive has an optical density of about 0.006 measured at 230 nm using a UV-V is spectrophotometer.

9. A geothermal system comprising:
   at least one of a geothermal heat exchanger, a geothermal cooling tower, and/or a geothermal pipe; and
   a geothermal fluid comprising suspended elemental sulfur disposed in the at least one heat exchanger, cooling tower, and/or pipe,
   wherein the geothermal fluid comprises:
     water;
     elemental sulfur and hydrogen sulfide; and
     a sulfur suspension additive that is an alkyldiphenyloxide disulfonate or salt thereof,
   wherein the sulfur suspension additive is present in an amount of from about 1 to about 100 parts by weight per one million parts by weight of the water.

10. The system of claim 9 wherein the fluid has an optical density of at least 0.05 measured at 230 nm using a UV-V is spectrophotometer when water comprising the elemental sulfur and the hydrogen sulfide and free of the sulfur suspension additive as a control sample has an optical density of about 0.006 measured at 230 nm using a UV-V is spectrophotometer.

11. The system of claim 9 wherein the alkyldiphenyloxide disulfonate or salt thereof has the following structure

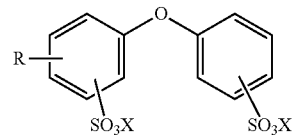

wherein R is an alkyl group having from 1 to 35 carbon atoms and each X is independently a cation.

12. The system of claim 11 wherein R is an alkyl group having 10 to 14 carbon atoms and X is Na$^+$.

13. The system of claim 11 wherein R is an alkyl group having 30 to 32 carbon atoms and X is Na$^+$.

14. The system of claim 9 wherein the sulfur suspension additive is present in an amount of from about 10 to about 50 parts by weight per one million parts by weight of the water.

* * * * *